United States Patent
Potrykus et al.

(10) Patent No.: US 6,747,926 B1
(45) Date of Patent: Jun. 8, 2004

(54) METHOD FOR REGULATING A ROTATIONAL SPEED

(75) Inventors: Sven Potrykus, Bad Salzdetfurth (DE); Dietmar Uchtmann, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 180 days.

(21) Appl. No.: 10/031,316

(22) PCT Filed: Jul. 14, 2000

(86) PCT No.: PCT/DE00/02339

§ 371 (c)(1), (2), (4) Date: Jun. 3, 2002

(87) PCT Pub. No.: WO01/06508

PCT Pub. Date: Jan. 25, 2001

(30) Foreign Application Priority Data

Jul. 16, 1999 (DE) .......................................... 199 33 419

(51) Int. Cl.$^7$ ................................................ G11B 7/00
(52) U.S. Cl. ................................ 369/47.28; 369/47.36; 369/47.48; 369/53.1
(58) Field of Search ............................ 369/53.1, 53.11, 369/53.3, 47.1, 47.28, 47.36, 47.38, 47.48, 47.49, 59.1

(56) References Cited

U.S. PATENT DOCUMENTS 5,425,014 A    6/1995   Shinichi et al.
5,805,548 A  * 9/1998   Ishihara et al. .......... 369/47.43

FOREIGN PATENT DOCUMENTS

| JP | 06 036289 | 5/1994 |
| JP | 07 073590 | 7/1995 |
| JP | 08 235770 | 1/1997 |
| JP | 11 110901 | 7/1999 |

* cited by examiner

*Primary Examiner*—Muhammad Edun
(74) *Attorney, Agent, or Firm*—Kenyon & Kenyon

(57) ABSTRACT

A method for setting a rotational speed for rotational readout of useful data stored on a disc-shaped storage medium in a playback device, permitting utilization of a maximum possible data transfer rate at a constant rotational speed. The useful data is stored approximately in data tracks arranged concentrically with an axis of rotation of the disc-shaped storage medium. An outermost data track which is opposite the axis of rotation and has been written with useful data on the disc-shaped storage medium is determined. A value is determined for the amount of data stored in the outermost data track. The rotational speed is set as a function of the amount of data thus determined and a data transfer rate, where the data transfer rate indicates a maximum amount of data that can be read out by the playback device per unit of time, so that the useful data stored in the outermost data track can be read out at the data transfer rate in playback of the disc-shaped storage medium. The rotational speed is kept constant when playing back the disc-shaped storage medium.

5 Claims, 2 Drawing Sheets

METHOD FOR REGULATING A ROTATIONAL SPEED

BACKGROUND INFORMATION

There are known playback devices designed as compact disc players in which a reader device reads out digital audio data from data tracks on a compact disc. These data tracks are arranged concentrically with an axis of rotation of the compact disc, and, to simplify the following description, they approximate a single spiral data track arranged on the compact disc. For readout of digital audio data stored in data tracks, the compact disc is rotated on a turntable, and the reader device moves radially with respect to the axis of rotation over the compact disc to read out the digital audio data.

Drives of compact disc players designed in this way are usually operated in an operating mode with a constant linear speed. Depending on the position of the reader device on the compact disc, the rotational speed is regulated so that a continuous data stream is read out at a constant amount of data per unit of time, i.e., at a constant linear speed. The constant linear speed is limited in particular by the tracking of the reader device over data tracks of the compact disc and by the processing capacity of the playback device for analysis of the digital audio data read out from the data tracks on the compact disc.

In the case of jumping tracks in the constant linear speed operating mode, the rotational speed must be adjusted as a function of the position of the reader device in order to maintain a constant amount of data per unit of time in reading out the digital audio data from the data tracks of the compact disc. However, the rate of access to data in the case of jumping tracks is reduced by the time required for adjustment of the rotational speed.

SUMMARY OF THE INVENTION

The method according to the present invention has the advantage over the related art that the rotational speed in playing back the disc-shaped storage medium is kept constant. In this way, the playback device is operated in a constant angular speed operating mode. In jumping tracks in the constant angular speed operating mode, it is not necessary to adjust rotational speed to control the amount of data read out per unit of time so that a higher access rate to data in the data tracks can be achieved when jumping tracks.

Another advantage is that an outermost data track of the disc-shaped storage medium which is opposite the axis of rotation and has been written with useful data is determined; a value is obtained for the amount of data stored in the outermost data track; the rotational speed is adjusted as a function of the amount of data thus determined and a data transfer rate, the data transfer rate indicating a maximum amount of data that can be read out by the playback device per unit of time, so that the useful data stored in the outermost data track can be read out at the data transfer rate when playing back the disc-shaped storage medium. In this way, the rotational speed of the respective disc-shaped storage medium is adjusted as a function of the data structure stored on the storage medium or the arrangement of data tracks having useful data on the storage medium. Thus, the rotational speed for each storage medium can be adjusted so that the maximum possible amount of data read out for this storage medium can be utilized per unit of time as a function of the data structure stored on the respective storage medium.

An especially simple method of determining the outermost data track is by analysis of content data in a lead-in area of the disc-shaped storage medium.

An especially accurate method of determining the value for the amount of data stored in the outermost data track is obtained by track jumping by the reader device of the playback device to this data track, by reading out the useful data from this data track and by measuring the number of useful data bits of this data track read out or by measuring the time required for this readout operation at a given constant linear speed in data readout.

DETAILED DESCRIPTION

Figure 1:
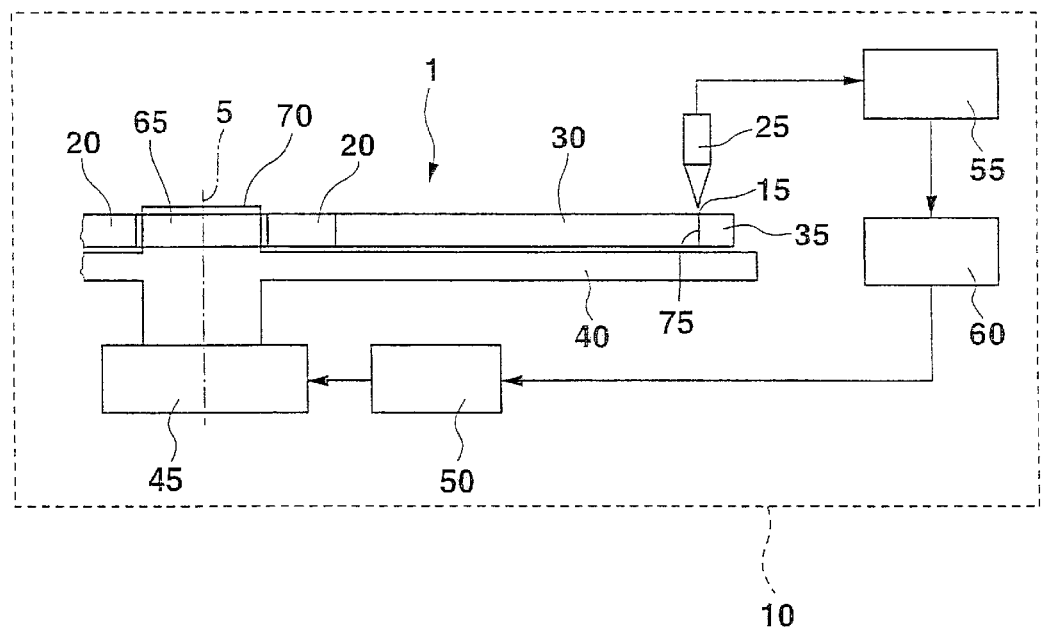
FIG. 1 shows a block diagram of a playback device.

FIG. 1 shows a playback device 10 for playing back a disc-shaped storage medium 1. This disc-shaped storage medium 1 may be, for example a magnetic storage disc, an optical storage disc or a magneto-optic storage disc. When storage medium 1 is designed as an optical storage disc, it may be, for example, a compact disc, a CD ROM, a digital video disc (DVD), a mini-disc, or the like. Playback device 10 is then designed accordingly as a drive for magnetic, optical or magneto-optical storage discs. When playback device 10 is designed as a drive for optical storage discs, it may be, for example, a compact disc player, a CD ROM drive, a drive for digital video discs, a drive for mini-discs, or the like.

Storage medium 1 is designed in the form of a circular disc which sits concentrically with an axis 5 of rotation on a turntable 40 which can be driven by a motor 45 so that storage medium 1 can rotate about axis 5 of rotation. Storage disc 1 is shown in cross section in FIG. 1 and has a rotation-symmetrical design with respect to axis 5 of rotation. Storage medium 1 includes a central disc hole 65 in the disc to receive a pin 70 of turntable 40 for centering storage medium 1 on turntable 4. Next to central disc hole 65 there is a lead-in area 20 of storage medium 1, which stores the content data and/or address data of useful data stored on storage medium 1. When storage medium 1 is designed as a compact disc, lead-in area 20 may contain a total playback time, a number of music titles, playback times of the music titles and starting addresses of the music titles. Next to lead-in area 20 of storage medium 1 there is a program area 30, storing useful data in a data track running in a spiral pattern concentrically with axis 5 of rotation. In simplified terms, the spiral data track can be considered here as approximately broken down into a plurality of data tracks concentric with axis 5 of rotation. In the case when storage medium 1 is designed as a compact disc, the useful data may be in the form of digital audio data. In the case when storage medium 1 is designed as a digital video disc, the useful data may be in digital form. In the case when storage medium 1 is designed as a CD ROM, the useful data may be in the form of program data. Next to program area 30 there is a lead-out area 35 which does not generally store any useful data. The content data and/or address data in lead-in area 20 is stored in the one spiral-shaped data track of storage medium 1. Therefore, this data track can also be thought of as broken down into multiple data tracks concentric with axis 5 of rotation in lead-in area 20. A reader device 25 moves radially over lead-in area 20 and program area 30 away from axis 5 of rotation for readout of data from storage medium 1. Reader device 25 reads data out of storage medium 1 and sends it to a decoder 55. Depending on the type of playback device 10, data is read out of storage medium 1 by reader device 25 either optically or magnetically. Data thus read out is decoded in decoder 55 and then sent to an analyzer unit 60. Analyzer unit 60 controls a motor controller 50 which in turn controls a motor 45. FIG. 1 shows only the elements of playback device 10 which are essential for implementation of the method according to the present invention.

In a playback operating mode, storage medium 1 is to be moved rotationally about axis 5 of rotation by reader device 25 at a constant rotational speed for readout of useful data in program area 30. Assuming the useful data has been stored at a constant linear recording speed of 1.2 m/s, for example, in program area 30, then the amount of data read out of the data tracks per unit of time in playback operating mode will be greater at an outer edge 75 of program area 30 opposite axis 5 of rotation than is the case in readout of data from data tracks of program area 30 closer to axis 5 of rotation. The rotational speed of storage medium 1 is thus limited by the maximum allowed amount of data for readout per unit of time at outer edge 75 of program area 30. This maximum amount of data read out by playback device 10 per unit of time is referred to below as the data transfer rate. The data transfer rate is limited from a mechanical standpoint by the trackability of reader device 25 over the data tracks of storage medium 1 in particular, and from the standpoint of information technology, it is limited by the speed in analysis of data by analyzer unit 60. A constant rotational speed of storage medium 1 in playback operating mode is then selected so that the useful data stored in an outermost data track 15 of program area 30 of storage medium 1, opposite axis 5 of rotation, can be read out at the data transfer rate in playback of storage medium 1. Thus, the data transfer rate is not utilized fully in reading out data tracks that are located closer to axis 5 of rotation than outermost data track 15.

To be able to achieve the data transfer rate when playing back storage medium 1, at least for outermost data track 15, outermost data track 15 and the amount of data stored in it must first be determined in analyzer unit 60. The rotational speed can then be adjusted by motor controller 50 as a function of the data transfer rate and the amount of data thus determined in outermost data track 15. According to FIG. 1, outermost data track 15 is arranged at the boundary between program area 30 and lead-out area 35, i.e., at outer edge 75. However, outermost data track 15 may also be located in program area 30, closer to axis 5 of rotation. In any case, outermost data track 15 is the outermost data track in program area 30 of storage medium 1 which has been written with useful data and is opposite axis 5 of rotation and is thus the outermost data track of storage medium 1 itself which has been written with useful data and is opposite axis 5 of rotation.

Outermost data track 15 can be determined by analysis of the content data and/or address data read out of lead-in area 20. At a given constant linear speed in recording, the distance of outermost data track 15 from axis 5 of rotation can be determined from the total playback time of storage medium 1, which is optionally stored in the lead-in area, or by calculating it by using the address data and/or content data from lead-in area 20 for playback of useful data on storage medium 1 of 1.2 m/s, for example, and a given distance between adjacent data tracks of 1.6 μm, for example. By using the given constant linear speed in recording, the amount of data stored in outermost data track 15 can then also be determined. When this amount of data is divided by the data transfer rate and then the inverse is formed, this yields the desired constant rotational speed for the playback operating mode.

For a more accurate determination of the amount of data stored in outermost data track 15, the constant linear speed in recording can also be measured. The constant linear speed in recording indicates the data track length required for storage of useful data for playback in one second of playback time. This can be determined by reader device 25 reading out precisely one given data track having a known radius with respect to axis 5 of rotation and analyzer unit 60 determining how long the playback time is for playback of the given data track. Dividing the size of the given data track, which can be calculated on the basis of the known radius, by the playback time determined in analyzer unit 60 for data read out from the given data track, yields the constant linear speed in recording.

The amount of data stored in outermost data track 15 can also be determined more accurately by reader device 25 jumping tracks to this outermost data track 15 and reads out the useful data stored there. Analyzer unit 16 can then determine the amount of data of the useful data thus read out. Then by dividing the amount of data thus determined by the data transfer rate and next forming the inverse value, as described above, it is possible to determine the desired rotational speed for playback of storage medium 1 in the playback operating mode.

The amount of data of outermost data track 15 can also be determined by reader device 25 jumping tracks to outermost data track 15 and reading it out at a predetermined constant linear data reading speed. Then in analyzer unit 60, the time required for readout of useful data from outermost data track 15 is determined. The amount of data of useful data in outermost data track 15 is then determined from the data track length calculated by multiplying the given constant linear data reading speed by the time determined in analyzer unit 60, assuming that the amount of data stored per unit of data track length is known and given. Then the desired rotational speed for playback operating mode is again calculated from the calculated amount of data and the data transfer rate by the method described above.

Figure 2:
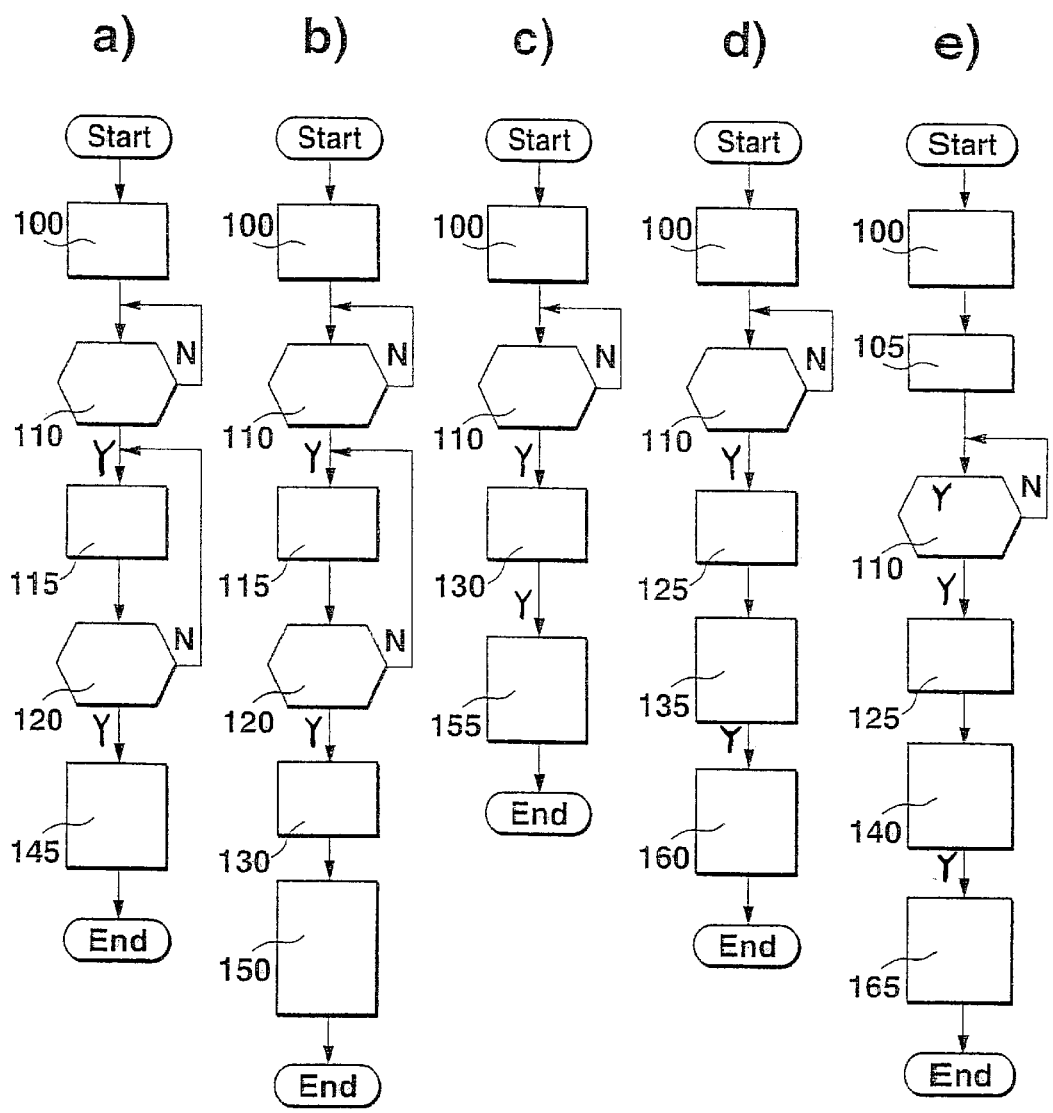
FIG. 2 shows flow charts for five different designs of the method according to the present invention for adjusting a rotational speed.

FIG. 2 shows flow charts for five different possibilities for determining the constant rotational speed for playback operating mode. The same reference notation denotes the same program points here.

A first possible embodiment is illustrated in FIG. 2(a). At a first program point 100, motor controller 50 causes motor 45 to drive turntable 40 at a first preset constant rotational speed. Then the procedure branches off to a second program point 110. At second program point 110, analyzer unit 60 checks on whether a storage medium. 1 has been placed in playback device 10. If this is the case, then the program branches off to a third program point 115; otherwise it branches back to second program point 110. At third program point 115, the content data and/or address data is read out of lead-in area 20 by reader device 25. Then the program branches off to a fourth program point 120. At fourth program point 120, analyzer unit 60 checks on whether readout of data from lead-in area 20 is concluded. If this is the case, the program branches off to a fifth program point 145; otherwise, it branches back to third program point 115. At fifth program point 145, a second constant rotational speed for the playback operating mode of motor controller 50 is set on motor 45 for driving turntable 40, under the assumption of a given constant linear recording speed of 1.2 m/s, for example, and a given distance of 1.6 µm, for example, between adjacent data tracks in the manner described above, taking into account the data transfer rate, motor controller 50 being driven accordingly by analyzer unit 60 which analyzes the content data and/or address data from lead-in area 20 and calculates the second constant rotational speed as described above. Then the program is exited.

According to a second embodiment of the method according to the present invention, a second flow chart is shown in FIG. 2(*b*). This flow chart corresponds to the flow chart shown in FIG. 2(*a*) up to and including fourth program step 120. After fourth program point 120, it branches off to a sixth program point 130 for a "yes" decision according to FIG. 2(*b*); otherwise, it branches back to third program point 115. At sixth program point 130, analyzer unit 60 performs a measurement of the constant linear recording speed in the manner described previously. Then it branches off to a seventh program point 150. At seventh program point 150, analyzer unit 60 calculates the second constant rotational speed for the playback operating mode in the same manner as that used at fifth program point 145, but the given value of 1.2 m/s, for example, is no longer used for the constant linear recording speed, but instead the value measured in analyzer unit 60 is used, so the determination of the second constant rotational speed in the embodiment according to FIG. 2(*b*) is more accurate. The program is exited after seventh program point 150.

FIG. 2(*c*) shows a third embodiment of the method according to the present invention. This third embodiment corresponds in its flow chart to the flow charts shown in FIGS. 2(*a*) and 2(*b*), up to and including second program point 110. According to FIG. 2(*c*), from second program point 110, the program branches off for a "no" decision, back to second program point 110, and in the case of a "yes" decision, it branches directly (i.e., without readout and analysis of the content data and/or address data stored in lead-in area 20) to sixth program point 130, and the constant linear recording speed is measured as described above. Then it branches off to an eighth program point 155. At eighth program point 155, the second constant rotational speed for the playback operating mode is determined by assuming that outermost data track 15 is arranged on outer edge 75 of program area 30 according to FIG. 1, the distance of this outer edge 75 from axis 5 of rotation being known in analyzer unit 60 on the basis of the given arrangement of lead-in area 20, program area 30 and lead-out area 35 on disc-shaped storage medium 1. Then the second constant rotational speed for the playback operating mode is determined in analyzer unit 60 from outermost data track 15 thus assumed and the measured constant linear recording speed, and motor 45 is controlled by motor controller 50 accordingly to adjust this rotational speed. The program is exited after eighth program point 155.

According to FIG. 2(*d*), a fourth embodiment of the method according to the present invention is shown. Up to and including second program point 110, the flow chart according to FIG. 2(*d*) corresponds to the flow charts described previously according to FIGS. 2(*a*) through 2(*c*). In the case of a "yes" decision, the program branches off from second program point 110 to a ninth program point 125, and in the case of a "no" decision, it branches back to second program point 110. At ninth program point 125, reader device 25 jumps to outermost data track 15 of disc-shaped storage medium 1, which has been written with useful data and is opposite axis 5 of rotation, this outermost data track 15 being located in program area 30 of disc-shaped storage medium 1. Then in the manner described above, analyzer unit 60 determines the amount of data in outermost data track 15 at a tenth program point 135. By using the amount of data determined in tenth program point 135 and the data transfer rate, analyzer unit 60 calculates the second constant rotational speed for the playback operating mode in the manner described above and controls motor 45 over motor controller 50 to adjust this second constant rotational speed in a subsequent eleventh program point 160. Then the program is exited.

According to FIG. 2(*e*), a flow chart for a fifth embodiment of the method according to the present invention is illustrated. After first program point 100, the program branches off to a twelfth program point 105, and a given constant linear data reading rate for reading out the useful data from the data tracks of program area 30 is set. Then the program branches off to second program point 110. At second program point 110, a check is performed in the known manner to determine whether a storage medium 1 has been placed in playback device 10. If this is the case, then the program branches off to ninth program point 125; otherwise, it branches back to second program point 110. After reader device 25 jumps tracks at ninth program point 125 to outermost data track 15, the program branches off to a thirteenth program point 140. At thirteenth program point 140, the time required for readout of outermost data track 15 by reader device 25 at a predetermined constant linear data reading speed is determined in analyzer unit 60. Then the program branches off to a fourteenth program point 165. At fourteenth program point 165, analyzer unit 60 determines the amount of data stored in this outermost data track 15 from the time determined at the thirteenth program point 140 and the predetermined constant linear data reading rate for readout of the data from the outermost data track 15, as described above. Analyzer unit 60 then calculates the second constant rotational speed for the playback operating mode from the amount of data thus determined and the data transfer rate in the manner described above and controls motor 45 accordingly to set this rotational speed on turntable 40 by way of motor controller 50. Then the program is exited.

What is claimed is:

1. A method of setting a rotational speed for a rotational readout of useful data stored on a disc-shaped storage medium approximately in data tracks, the data tracks being situated concentrically with an axis of rotation of the disc-shaped storage medium in a playback device, the method comprising:

determining an outermost data track which is opposite the axis of rotation and has been written with useful data on the disc-shaped storage medium;

determining a value for an amount of data stored in the outermost data track, the value being determined by measurement;

setting the rotational speed as a function of the amount of data thus determined and a data transfer rate, the data transfer rate indicating a maximum amount of data that can be read out by the playback device per unit of time, so that useful data stored in the outermost data track can be read out at the data transfer rate when playing back the disc-shaped storage medium; and keeping the rotational speed constant when playing back the disc-shaped storage medium.

2. The method according to claim 1, wherein the outermost data track is determined by analyzing content data in a lead-in area of the disc-shaped storage medium.

3. The method according to claim 1, wherein the value for the amount of data stored in the outermost data track is determined as a function of a measurement of a constant linear recording speed with which useful data has been stored in the data tracks of the disc-shaped storage medium.

4. The method according to claim 1, wherein the value for the amount of data stored in the outermost data track is determined by a reader device of the playback device jumping tracks to the outermost data track, reading out the useful data from the outermost data track and measuring a number of useful data bits thus read out from the outermost data track.

5. The method according to claim 1, wherein the value for the amount of data stored in the outermost data track is determined by a reader device of the playback device jumping tracks to the outermost data track, reading out in a read out operation the useful data from the outermost data track at a predetermined constant linear speed and measuring a time for the readout operation.

* * * * *